Feb. 15, 1944.　　　O. SANDLIN　　　2,342,013
MACHINE FOR PLUCKING POULTRY AND THE LIKE
Filed Dec. 3, 1941
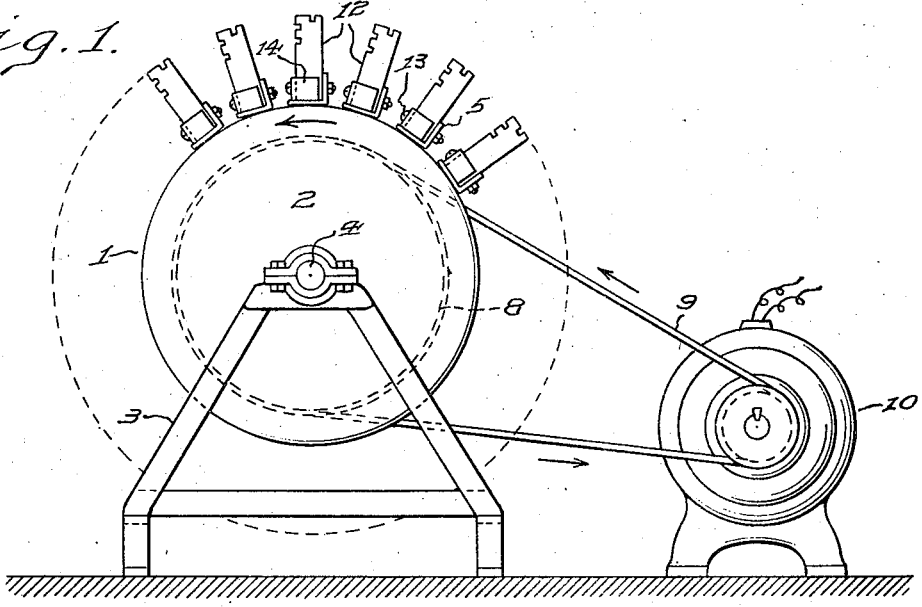
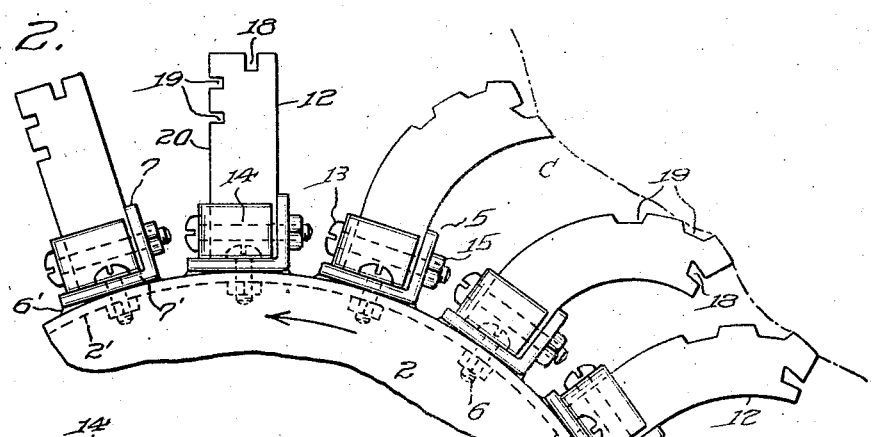
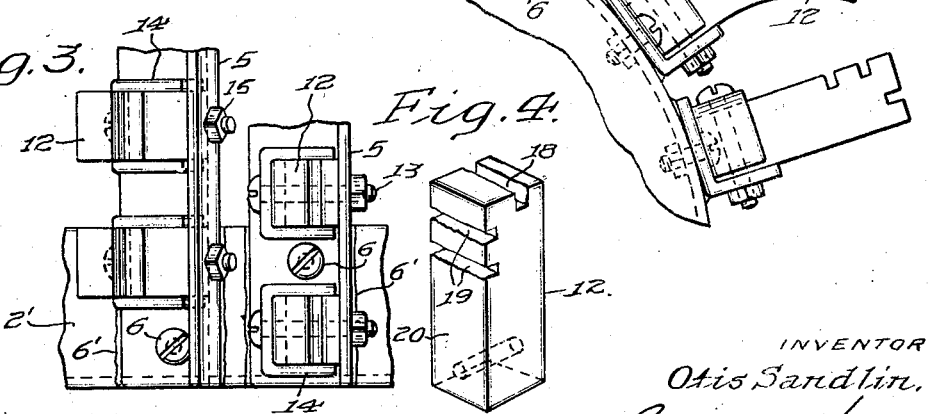
INVENTOR
Otis Sandlin.
WITNESS
BY George K. Helbert
ATTORNEY Patented Feb. 15, 1944

2,342,013

UNITED STATES PATENT OFFICE 2,342,013

MACHINE FOR PLUCKING POULTRY AND THE LIKE

Otis Sandlin, Philadelphia, Pa., assignor to Whistler's Picking Machine Company, Philadelphia, Pa., a copartnership composed of Frances E. Sandlin and Otis Sandlin Application December 3, 1941, Serial No. 421,517

6 Claims. (Cl. 17—11.1)

The invention relates to machines for plucking or picking poultry and is especially directed to an improvement over that disclosed in my copending application Serial No. 366,828, filed November 23, 1940, which is now Patent 2,286,650 and of which this application is a continuation in part, removal of the feathers being accomplished by the present machine with even greater rapidity and thoroughness than heretofore without bruising, abrading or otherwise damaging either the meat or the skin of the fowl.

It is therefore a principal object of the invention to provide improved mechanical means whereby the feathers may be rapidly and completely removed from poultry without damaging the carcasses in any way while preserving the "bloom" on the surface of the skin and giving it the same appearance as that of poultry carefully plucked by hand and without scalding.

A further object is the provision of improved feather removing elements adapted for incorporation in a plucking machine of the character disclosed in my said copending application and which are possessed of an enhanced capacity for effectively plucking poultry when so incorporated.

Another object is the provision in a machine of this character of feather-removing elements or studs made of resilient material and so formed and proportioned as to present relatively sharp edges and areas of relative strength and weakness in a manner for most efficient removal of the feathers.

A still further object of the invention is the provision of novel means for holding the plucking studs in the machine whereby their accurate alignment is positively maintained during its operation and the removal and replacement of any which may become worn or damaged is facilitated.

Other objects, purposes and advantages of the invention will hereinafter more fully appear or will be understood from the following description of one embodiment of it illustrated in the accompanying drawing, in which Fig. 1 is a diagrammatic side elevation of the plucking machine as a whole;

Fig. 2 is a fragmentary side elevation on a greatly enlarged scale illustrating the machine in operation;

Fig. 3 is a fragmentary top plan view on a like scale of a portion of the machine; and Fig. 4 is a perspective view of one of the plucking elements or studs removed from the machine.

In the several figures like characters are used to designate the same parts.

Referring now more particularly to the drawing, the machine diagrammatically illustrated therein is eminently suitable for commercial use in realizing the purposes and objects of the invention and has, therefore, been selected to conveniently exemplify the latter, but it will be understood that means other than those shown may be utilized for supporting and actuating the plucking elements or studs which actually contact the feathers of the fowls and perform the plucking operation, and that utilization of such other supporting and actuating means is expressly contemplated by the invention.

The aforesaid machine comprises in general a substantially cylindrical "squirrel-cage" type drum 1 formed by a pair of circular end plates 2 mounted for rotation in a frame 3 on a shaft 4 and held in axially spaced assembled relation at the opposite ends of a plurality of circumferentially spaced peripheral ribs 5 to which they are secured by bolts 6 and weld metal 6'. The ribs 5 are preferably formed from angle bars with radially extending flanges 7 and circumferential flanges 7', the latter being attached to inwardly axially extending rims 2'' respectively welded on the plates 2. A pulley 8 on the shaft 4 receives a belt 9 passing over a smaller pulley on the shaft of a motor 10 whereby the drum can be rotated at a suitable speed, preferably approximately 420–425 R. P. M. when a drum about 12'' in diameter is employed. Of course, drums of other sizes may be used and their respective rates of rotation adjusted accordingly and I have found that excellent results are attained when the machines are operated in such a way as to move the outer ends of the plucking studs 12, hereinafter more fully described, at about 2,000 feet per minute.

These studs 12, which constitute the plucking or feather removing elements to which reference has been made, are preferably formed from pure gum rubber stock, such as pieces of strip stock of rectangular cross-section and about one inch square cut into suitable lengths. Three inch lengths of this stock are well adapted for making the studs and after being cut each length is provided near one end with a hole for the passage of a bolt 13, cooperative with a generally U-shaped clip 14 and nut 15 for securing the stud in the machine, each clip embracing three sides of its stud near the base and clamping the fourth side against the adjacent face of the radial flange 7 of one of ribs 5.

It will be evident that the clip defines three sides and the flange 7 a fourth side of a generally rectangular socket for the base of the stud so that when the latter is secured therein through the medium of bolt 13 with the inner end face of the stud abutting the circumferential flange 7' of the rib, the stud is firmly held at its base and prevented from moving about the axis of the bolt even though but one bolt is used for each stud, and that each of the several studs is therefore firmly maintained in proper relation to the others and to the drum during operation of the machine. Moreover, any stud may be selectively removed in case it becomes worn or damaged without disturbing any of the others and a new stud substituted therefor and properly and accurately positioned with relation to the other parts of the machine in a minimum of time and with very little effort.

A transverse slot 18 is formed in the outer end of each stud and a plurality of generally similar slots 19 are cut into its front face 20; the slots 18 and 19 are desirably about an eighth of an inch wide and may be produced with a grinding wheel or other instrument leaving more or less roughened side walls and edges; the resultant roughness of these side walls and edges is of advantage as it apparently enhances their effectiveness in plucking feathers when the stud is in operation. It is usually preferable, though not necessary, to make the slot 18 in the end of the stud a little deeper than the slots 19, and they are thus desirably about ¼" and ⅛" deep respectively.

A plurality of these studs 12 are mounted on each of the ribs 5 of the machine, being held through the medium of bolts 13 and nuts 15 firmly in the sockets formed by the clips 14 and the adjacent rib, and project radially from the drum at intervals along the rib about equal to or a little less than the thickness of a single stud. The several studs on each rib, moreover, are preferably staggered or axially offset at substantially like intervals with relation to those on adjacent ribs as indicated in Fig. 3 and when the drum is rotated the studs on alternate ribs, therefore, follow each other or "track" in paths which adjoin, or even slightly overlap the paths of the studs on the intervening ribs.

Consequently, when a carcass, indicated at C in Fig. 2, is brought against and moved about in engagement with the studs while the drum is rotating, there are no voids between the parts attacked by adjacent rows, and every part of the carcass can, therefore, be quickly and effectively subjected to the plucking action of the studs.

This action occurs most smoothly when the studs are kept wet, as with the residual moisture carried to them by the carcasses, which are preferably immersed in water at about 120° F. on their way to the machine, and is probably performed mainly by the acute more or less roughened edges presented by the slots 18 and 19 in the studs as the latter are brought into play for plucking poultry in the manner to be hereinafter more fully described. The roughness of these edges is apparently retained indefinitely under normal conditions of use, for even after a period of several months of substantially continuous daily operation in plucking poultry the studs reveal little or no evidence of material wear or other deterioration.

When the machine is in operation with the drum rotating counter-clockwise as viewed in Fig. 1, it is usually most convenient for the operator to stand at the right-hand side of the machine in said figure with the motor 10 thus on the floor at his right, and by having the semi-scalded fowl carcasses delivered to him successively at his left by a conveyor (not shown), which first carries them through the hot (120° F.) water, he can readily bring each against the periphery of the rotating drum in a manner to forcibly contact it in quick succession with several of the rapidly moving studs 12. As the latter are bent rearwardly when the carcass bears against them in the manner indicated at the right hand side of Fig. 2, the edges formed by the slots 19, and later, the edges of slots 18 frictionally engage and quickly and effectively remove the feathers; the operator thus has merely to turn the carcass to expose all parts of it to the action of the studs to rapidly and easily complete the plucking operation.

As the studs successively move out of contact with the carcass after having been bent rearwardly by pressure of the latter, each carries some of the feathers with it until its inherent resiliency restores it to its normal radial position, usually with a sudden snap which catapults the feathers outwardly from the drum and prevents the studs from becoming clogged therewith.

The staggered relation of the studs on the drum and the speed at which it is preferably operated enables every portion of the carcass to be exposed to engagement by a large number of the studs in rapid succession, with the result that all the feathers are cleanly and quickly plucked in a minimum of time and with very little effort on the part of the operator. In fact, a single operator without any particular special training in the operation or use of the machine can pluck as many carcasses in a given time as two or even more of the most expert pluckers can pluck in any other way in the same period of time; a machine equipped with my novel studs, moreover, enables poultry to be plucked much more cleanly, with substantially complete removal of the "pin" feathers and with less damage either through bruising or abrading of the skin or removal of "bloom" therefrom than by other methods or with other plucking aids with which I am familiar, while it is so much more rapid than the extremely careful hand plucking necessary to produce dressed poultry of comparable appearance as to "bloom," bruises, abrasions and the like that a comparison by figures would appear exaggerated. It may be noted, however, that in one plant in which my machines have been used, their introduction has enabled a crew of eighteen employees to prepare for market five thousand fowl per day whereas prior to the introduction of the machines a crew of forty was required to attain this production rate.

While I have herein described one embodiment of the invention with considerable particularity, especially as embodied in a specific machine of the rotating drum type, it will be understood I do not desire or intend thereby to limit or confine the invention thereto in any way, as changes and modifications in its form, construction, and arrangement as well as in many other respects will readily occur to those skilled in the art and may be made if desired without departing from the spirit and scope of the invention as defined in the appended claims.

Having thus described my invention, I claim and desire to protect by Letters Patent of the United States:

1. In a poultry plucking machine of the character described and comprising a rotatable drum, a plurality of flexible studs projecting radially from the drum each having a plurality of slots across one face and a slot across its radially outer end having its longitudinal axis substantially parallel to the walls of the face slots.

2. In a poultry plucking machine a rotatable drum comprising ribs projecting radially from its periphery, a plurality of substantially U-shaped clips proximate each rib and defining therewith spaced substantially rectangular sockets, and a resilient stud projecting from each socket radially of the drum.

3. A feather engaging stud for a poultry plucking machine consisting of a length of rubber stock of substantialy rectangular cross-section having a plurality of transverse slots in one lateral face in spaced relation to each other longitudinally of the stud, each slot having side walls substantially normal to said face and a slot extending across the end face of the stud.

4. A feather engaging stud consisting of a length of a rubber stock of substantially rectangular cross-section having a slot extending across one end and a plurality of generally similar but shallower slots in one lateral face in spaced relation to each other longitudinally of the stud, each slot having roughened side walls substantially normal to said face.

5. A feather engaging stud for a poultry plucking machine consisting of a length of rubber stock of substantially rectangular cross-section having a plurality of transverse slots in one lateral face in spaced relation to each other longitudinally of the stud, each slot having side walls substantially normal to said face, and the stud having a slot extending across the end face thereof.

6. In a poultry plucking machine comprising a rotatable drum embodying a plurality of circumferentially spaced, peripheral, transversely extending ribs, each rib including a flange disposed substantially normal to a radius of the drum and a second flange extending normal to the first flange, a plurality of normally rectangular elongated resilient studs spaced along each rib, each stud having one end face engaging the first flange and a lateral face engaging the second flange, a substantially U-shaped clip embracing the other three lateral faces of the stud and seating on the first flange, and means for removably securing the clip and stud to the rib.

OTIS SANDLIN.